Aug. 6, 1935.                G. E. HULSE                2,010,431

REFRIGERATION

Filed Dec. 6, 1929

INVENTOR
George E. Hulse
BY
Janney, Blair + Curtis
ATTORNEYS

Patented Aug. 6, 1935

2,010,431

UNITED STATES PATENT OFFICE 2,010,431

REFRIGERATION

George E. Hulse, New Haven, Conn., assignor to The Safety Car Heating & Lighting Company, a corporation of New Jersey Application December 6, 1929, Serial No. 412,038

8 Claims. (Cl. 62—91.5)

This invention relates to refrigeration.

One of the objects thereof is to provide simple and practical apparatus for refrigeration. Another object is to provide apparatus of the above nature characterized by efficient and reliable action. Another object is to provide an art of refrigerating which shall be thoroughly practical and be dependable in its results. Other objects will be in part obvious and in part pointed out hereinafter.

The invention accordingly consists in the features of construction, combinations of elements, arrangements of parts, and in the several steps and relation and order of each of the same to one or more of the others, all as will be illustratively described herein, and the scope of the application of which will be indicated in the following claims.

Figure 1:
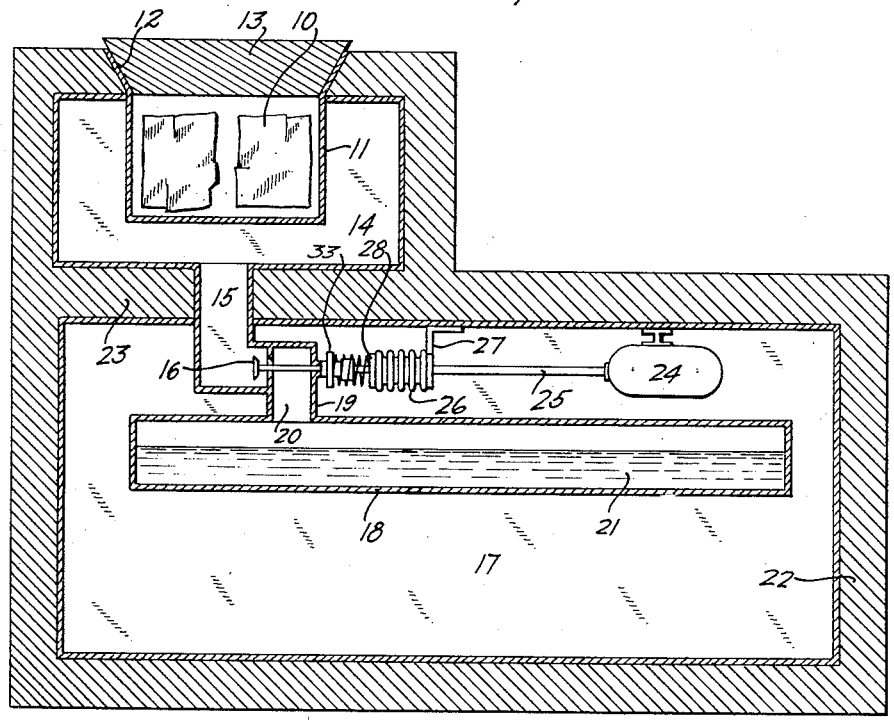
Figure 2:
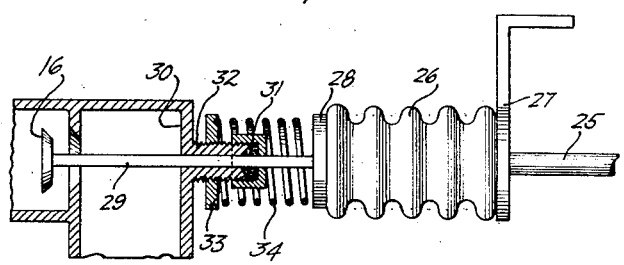

In the accompanying drawing, in which is shown one of various possible embodiments of this invention, Figure 1 is a semi-diagrammatic sectional elevation; and Fig. 2 is a sectional detailed view of the valve-controlling mechanism shown in Fig. 1.

Similar reference characters refer to similar parts throughout both views of the drawing.

Referring now to the drawing in detail, there is shown at 10 a frozen body such as ice formed from water or carbon dioxide, and it is to be understood that the term "frozen body" is used in a broad sense to cover any equivalent substance for these illustratively suggested.

The ice 10 is positioned in a container 11 formed of sheet copper or the like to possess high heat-conducting qualities, and provided at the top with a flaring mouth 12 into which is fitted a suitable closure 13 of heat-insulating material. A jacketing chamber 14 is formed about the container 11 and leads at the bottom through a passage 15 to a valve 16 controlled as hereinafter described.

A heat-insulated cooling chamber 17, into which any materials desired to be cooled may be placed and access to which may be gained through any suitable doors or the like (not shown), is provided with a refrigerating or heat-withdrawing member 18 of suitable heat-conducting material, and preferably in the form of a container, having an extension 19 on its upper side forming a passage 20 which leads to the seat of the valve 16. The container 18 has therein a suitable volatile liquid, indicated at 21.

Preferably the liquid 21 in the chamber 17 is under a pressure above atmospheric pressure at or below the temperature which it is desired to maintain in chamber 17. For example, if I desire to maintain a temperature in the vicinity of 10° F. within chamber 17, I may fill the member 18 with iso-butane which has a boiling point of 10° F. at atmospheric pressure. In such case, any possible leakage in the system in which the liquid 21 or its vapor is contained would be outward thereof, resulting in maintenance of refrigerating action even though there is slight loss of refrigerant. The pressure might, however, be below atmospheric, in so far as certain features of my invention are concerned, but, in that case, I lose the advantage of maintained refrigerating effect in case of leakage, for air would leak into the system and at once diminish the refrigerating action.

This chamber 17 and the exterior walls of the chamber 14 are lagged with heat-insulating material 22 so as to reduce to a minimum the transmission of heat therethrough. The heat insulation is extended, as indicated at 23, to form a substantially continuous wall between the two chambers.

Turning now to the mechanism by which the valve 16 is controlled, it is to be noted that there is positioned within the chamber 17 a thermostatic cell 24 which preferably contains a body of the same liquid as is placed within the receptacle 18. This cell is connected as by the tube 25 with an expansible capsule 26 which, with its associated parts, is best shown in Fig. 2 of the drawing. One end of this capsule 26 is anchored as by the stationary plate 27, and its opposite end is affixed to a movable plate 28 having thereon the stem 29 of the valve 16. This stem passes through a wall 30 of the passage 20 and is provided with a gland or stuffing-box 31 of suitable construction upon a nipple 32 formed on the wall 30. Threaded upon the outer surface of this nipple or boss is a nut 33 having a circular groove or seat for one end of a spiral spring 34 the opposite end of which is seated in a similar groove in the plate 28. It will be seen that by a suitable adjustment of the nut 33, the pressure upon the plate 28 may be reduced to zero, in which case this plate will be moved and the valve 16 opened upon the accumulation of any appreciable pressure within the capsule 26. If desired, however, the nut 33 may be so adjusted that the valve-opening action may occur only at any desired predetermined pressure within the capsule.

Considering now the action of this apparatus, it will be seen that whenever the temperature within the chamber 17 exceeds the desired value, the thermostatic cell 24, which is so positioned in there as to experience the average temperature of the space, will tend to evaporate its contents. This evaporation, by causing pressure within the capsule 26, will open the valve 16 and relieve any accumulated pressure upon the liquid 21. This main body of liquid will thereupon evaporate with a cooling effect, and its vapor will pass through valve 16 into thermal relation with the ice 10 and be condensed thereby flowing back past the valve into the receptacle 18. This action will continue until the temperature within the chamber 17, and consequently within the thermostatic cell 24, has been reduced to its desired value, whereupon the decrease of pressure in capsule 26 will cause the closing of the valve 16. If, due to its position in the chamber 17, or for other reason, there is any further evaporation of the liquid 21, it will, with valve 16 closed, quickly raise the pressure upon its surface so as to cause such evaporation to stop. If it is desired to gain and maintain a higher temperature within the chamber 17, the spring 34 is so adjusted as to necessitate a higher internal pressure of the capsule 26 corresponding to a higher pressure upon the surface of the liquid within the cell 24 and a higher temperature necessary to evaporate it and cause the valve to open.

It will thus be seen that whatever the position of the receptacle 18, the cell 24 will cause a maintenance of substantially constant temperature within the chamber. Certain of the advantages of this invention may be achieved by using a different volatile liquid in the thermostatic cell 24 than that employed in the receptacle 18.

It will thus be seen that there is provided apparatus and an art in which the objects of this invention are achieved, and that both are characterized by an extreme degree of simplicity, thus reducing cost and enhancing certainty of action.

As many possible embodiments may be made of the mechanical features of the above invention and as the art herein described might be varied in various parts, all without departing from the scope of the invention, it is to be understood that all matter herein set forth or shown in the accompanying drawing is to be interpreted as illustrative and not in a limiting sense.

I claim:

1. In refrigerating apparatus, in combination, a container having therein a volatile liquid, means forming a cooling chamber for articles to be cooled about said container, a valve controlling the escape of vapor from said container, means controlling said valve in accordance with the temperature within said chamber, means forming a second chamber communicating with said valve, and means within said second chamber adapted to condense said vapor and return it through said valve to said container, said condensing means comprising a heat-transmitting receptacle within said second chamber and containing a frozen body and having its interior free from connection with the interior of said second chamber.

2. In refrigerating apparatus, in combination, a container having therein a volatile liquid, means forming a cooling chamber for articles to be cooled about said container, a valve controlling the escape of vapor from said container, means controlling said valve in accordance with the temperature within said chamber, means forming a second chamber communicating with said valve, and means within said second chamber adapted to condense said vapor and return it through said valve to said container, said condensing means comprising a heat-transmitting receptacle within said second chamber and containing a frozen body and having its interior free from connection with the interior of said second chamber, heat-insulating means between said chambers, and means adapted to adjust the standard of action of said valve.

3. In refrigerating apparatus, in combination, a metallic container having therein a volatile liquid, means forming a cooling chamber for articles to be cooled about said container, means forming a second chamber, a valve for controlling the flow of vapor from said container to said second chamber and for controlling the flow of liquid from said second chamber to said container, means responsive to the temperature within said first-mentioned chamber for controlling the action of said valve, and condensing means in said second chamber comprising a separate receptacle disposed therein and sealed from the interior of said second chamber, said receptacle adapted to hold solid carbon dioxide and being formed from heat-transmitting material.

4. In refrigerating apparatus, in combination, a metallic container having therein a volatile liquid, means forming a cooling chamber for articles to be cooled about said container, means forming a second chamber, a valve for controlling the flow of vapor from said container to said second chamber and for controlling the flow of liquid from said second chamber to said container, means responsive to the temperature within said first-mentioned chamber for controlling the action of said valve, condensing means in said second chamber comprising a separate receptacle disposed therein and sealed from the interior of said second chamber, said receptacle adapted to hold solid carbon dioxide and being formed from heat-transmitting material, and heat-insulating means disposed between said chambers.

5. In refrigerating apparatus, in combination, means forming a space for the storage of articles to be cooled, a metallic container disposed within said space and containing a volatile liquid to form an evaporator, a condensing chamber heat insulated from said space, means connecting said container with said condensing chamber including a valve responsive to the temperature of said space for controlling the flow of vapor from said container to said condensing chamber and for controlling the flow of liquid from said condensing chamber to said container, and a metallic receptacle disposed within said condensing chamber and having its interior free from connection with the interior of said condensing chamber, said receptacle adapted to hold a refrigerating medium such as solid carbon dioxide.

6. In refrigerating apparatus, in combination, means forming a space for the storage of articles to be cooled, a metallic container disposed within said space and containing a volatile liquid to form an evaporator, a condensing chamber heat-insulated from said space, means connecting said container with said condensing chamber including a valve responsive to the temperature of said space for controlling the flow of vapor from said container to said condensing chamber and for controlling the flow of liquid from said condensing chamber to said container, and a metallic receptacle disposed within said condensing chamber and having its interior free from connection with the interior of said condensing chamber, said receptacle adapted to hold a refrigerating medium sufficiently cold to condense the vapor of said volatile liquid.

7. In refrigerating apparatus, in combination, means forming a space for the storage of articles to be cooled, a metallic container disposed within said space and containing a volatile liquid to form an evaporator, a condensing chamber heat-insulated from said space, means connecting said container with said condensing chamber including a valve responsive to the temperature of said space for controlling the flow of vapor from said container to said condensing chamber and for controlling the flow of liquid from said condensing chamber to said container, and a metallic receptacle disposed within said condensing chamber and having its interior free from connection with the interior of said condensing chamber, said receptacle adapted to hold a refrigerating medium sufficiently cold to condense the vapor of said volatile liquid, said temperature-responsive means including an actuating bellows connected to a container holding a volatile liquid.

8. In refrigerating apparatus, in combination, means forming a space for the storage of articles to be cooled, a metallic container disposed within said space and containing a volatile liquid to form an evaporator, a condensing chamber heat-insulated from said space, means connecting said container with said condensing chamber including a valve responsive to the temperature of said space for controlling the flow of vapor from said container to said condensing chamber and for controlling the flow of liquid from said condensing chamber to said container, a metallic receptacle disposed within said condensing chamber and having its interior free from connection with the interior of said condensing chamber, said receptacle adapted to hold a refrigerating medium sufficiently cold to condense the vapor of said volatile liquid, and means for changing at will the standard of operation of said temperature-responsive means.

GEORGE E. HULSE.